United States Patent
Byford et al.

(10) Patent No.: US 9,317,037 B2
(45) Date of Patent: Apr. 19, 2016

(54) WAREHOUSE VEHICLE NAVIGATION SYSTEM AND METHOD

(71) Applicant: Vocollect, Inc., Pittsburgh, PA (US)

(72) Inventors: Roger Graham Byford, Apollo, PA (US); Anshul Solanki, Haryana (IN)

(73) Assignee: Vocollect, Inc., Pittsburgh, PA (US)

( * ) Notice: Subject to any disclaimer, the term of this patent is extended or adjusted under 35 U.S.C. 154(b) by 116 days.

(21) Appl. No.: 13/644,035

(22) Filed: Oct. 3, 2012

(65) Prior Publication Data

US 2013/0096735 A1 Apr. 18, 2013

Related U.S. Application Data

(60) Provisional application No. 61/542,670, filed on Oct. 3, 2011.

(51) Int. Cl.
   *G01C 22/00* (2006.01)
   *G05D 1/00* (2006.01)
   *G05D 1/02* (2006.01)

(52) U.S. Cl.
   CPC ............ *G05D 1/0231* (2013.01); *G05D 1/0234* (2013.01); *G05D 1/0274* (2013.01); *G05D 2201/0216* (2013.01)

(58) Field of Classification Search
   None
   See application file for complete search history.

(56) References Cited

U.S. PATENT DOCUMENTS

| 5,938,710 | A | * | 8/1999 | Lanza et al. | 701/50 |
| 8,725,286 | B2 | * | 5/2014 | D'Andrea et al. | 700/214 |
| 2004/0073359 | A1 | * | 4/2004 | Ichijo et al. | 701/201 |
| 2005/0113978 | A1 | * | 5/2005 | Sharma et al. | 700/259 |
| 2006/0112034 | A1 | * | 5/2006 | Okamoto et al. | 706/16 |
| 2006/0184013 | A1 | * | 8/2006 | Emanuel et al. | 600/426 |
| 2008/0071429 | A1 | * | 3/2008 | Kraimer et al. | 701/2 |
| 2008/0262669 | A1 | * | 10/2008 | Smid et al. | 701/23 |
| 2011/0010023 | A1 | * | 1/2011 | Kunzig et al. | 701/2 |
| 2012/0282070 | A1 | * | 11/2012 | D'Andrea et al. | 414/495 |

* cited by examiner

*Primary Examiner* — Calvin Cheung
*Assistant Examiner* — Lail Kleinman
(74) *Attorney, Agent, or Firm* — Additon, Higgins & Pendleton, P.A.

(57) ABSTRACT

A system and method for the operation and navigation of a moving vehicle in a warehouse environment includes a controller for controlling operation of the vehicle and an imaging device configured to capture an image representing a view from the vehicle. Location labels are configured for being positioned in the warehouse environment and include location indicia.

A navigation processor is operatively coupled to the imaging device and configured to determine a location of the vehicle based at least in part on the image of the location label, the navigation processor further coupled with the controller to control the movement of the vehicle based on the determined location.

19 Claims, 7 Drawing Sheets

WAREHOUSE VEHICLE NAVIGATION SYSTEM AND METHOD

RELATED APPLICATIONS

This Application is a Non-Provisional Application and claims the filing benefit of U.S. Patent Provisional Application Ser. No. 61/542,670 filed Oct. 3, 2011, and entitled "PALLET TRUCK NAVIGATION SYSTEM METHOD", which application is incorporated herein by reference in its entirety.

FIELD OF THE INVENTION

The present invention relates generally to systems and methods for using a vehicle, such as a lift truck or similar device, and particularly to systems and methods of autonomously navigating a lift truck or other vehicle in a warehouse environment.

BACKGROUND OF THE INVENTION

A lift truck is an industrial vehicle that is utilized to lift and transport loads between locations. A lift truck generally includes a set of rails, or fork that is positioned under a pallet which is to be moved. The fork has an adjustable height that, once positioned under a pallet, is raised by a jack or other means to lift the pallet off the ground. Once the pallet has been lifted by the fork, the lift truck may be used to move the pallet to a new location.

One common application for lift trucks is picking up and transporting loads in a warehouse environment. Lift trucks used in a warehouse environment are often motorized to facilitate moving large loads and to increase the speed with which loads may be transported. Motorized lift trucks typically allow the operator to ride in the truck and drive the truck from one location to the next to increase the speed and efficiency with which pallets are moved.

Lift trucks are often used by workers in a warehouse environment, such as a distribution center, to assemble or pick an order from available inventory. To facilitate the ability to locate a desired inventory item, warehouses are typically organized into numbered aisles having storage racks on either side of the aisle. The storage racks are further subdivided into adjacent numbered slots, so that there are numerous storage areas within the warehouse with each storage area being uniquely identifiable by its aisle and slot number. A warehouse management system running on a centralized computer is typically used to keep track of items by their location in the warehouse, so that any item in stock may be located quickly by an aisle and slot number. To assemble an order, the lift truck operator, or order selector is provided with a list of items generated by the warehouse management system that includes the location of each item so that the items may be placed together on a pallet.

The item list may be in the form of a printout, but more typically will be conveyed to the order selector using a voice-directed warehousing system. Such voice-directed systems typically use speech synthesis and recognition technology to maintain a speech dialog with the order selector to facilitate assembling an order. For example, the order selector may wear a headset and/or portable, mobile computer that provides two-way speech communications. A larger centralized computer system maintains the item lists for various orders, and communicates with the mobile computers and order selector. The voice-directed system, through a voice application or task loaded on the mobile computer, directs the order selector to an item that is to be loaded onto the pallet—or picked—using synthesized speech commands. The speech commands identify the item to be picked and its location by aisle number and slot number so the order selector knows where to move the lift truck, and pick the item. Once the lift truck has been moved to the correct aisle and slot number, the order selector exits the lift truck and picks the item. The order selector then indicates to the voice-directed system that the item has been picked by speaking into the headset. The voice-directed system then directs the order selector to the next item to be picked and the selector drives the truck to the appropriate aisle and slot, with the process continuing until the order is complete. Voice-directed systems thus allow workers to keep their hands and eyes free to pick items and load them onto the pallet, as well as operate the lift truck, while maintaining communication with the voice-directed warehousing system.

When assembling orders, order selectors are typically required to visit several locations within the warehouse. To minimize the time required to assemble an order, the picking order is typically organized so that items which are located in close proximity or in the same aisle will be picked sequentially. In this way, the order selector may be directed to items in a logical sequence, which minimizes the distance between picks and the drive time, and thereby increases efficiency. As a result, multiple items will often be sequentially picked from slots in the same aisle, requiring the order selector to repeatedly exit and enter the lift truck within a very short period of time along the aisle. The order selector thus spends unproductive time and energy stepping onto the truck to move it a short distance down an aisle before stepping back off the truck to pick the next item. Thus, while picking items from a single aisle, it would be desirable for the order selector to be able to walk alongside the lift truck and pick the items while the lift truck continues to move in the direction of the next item, rather than requiring them to continually jump on the truck, drive it a short distance, and jump off.

Previous attempts to allow lift trucks to move autonomously through a warehouse have used very expensive and complicated navigation systems that rely on location indicia fixed to the ceiling or floor of the facility, such as signal reflectors or coded indicia. However, these systems require that the coordinates of the indicia be known precisely with respect to the location of objects, such as storage racks, within the warehouse. Furthermore, the entire facility has to be mapped with the indicia and/or sensors to provide proper navigation. This requirement adds significant implementation costs. Moreover, any changes to the configuration of aisles within the warehouse will require that the system be reprogrammed and/or location indicia moved so that the system knows the new warehouse configuration. Indicia fixed to the ceiling are typically positioned far enough from the lift truck so that accurate positioning of the truck is difficult, while indicia fixed to the floor must withstand the wear and tear caused by vehicle wheels. A further challenge is that the distance the truck has moved is typically determined based on wheel rotations, and the diameter of a lift truck tire may vary by as much as 25% over its useful life. Therefore, with such a variation, it is difficult to determine the speed and distance travelled for a lift truck. Thus, the current solutions to determining the location of lift trucks in a warehouse environment have proven to be more expensive and less reliable than desired.

Therefore, there is a need for improved methods and systems for navigating lift trucks within a warehouse. Further, there is a need to allow lift trucks to accurately and autonomously move around a warehouse based on the location of the lift truck and the known location of the inventory items to be picked so that the time and effort expended by the order selector is reduced. Furthermore, there is a need for such a system that is minimally impacted by any changes to the configuration of the aisles within the warehouse.

BRIEF DESCRIPTION OF THE DRAWINGS

The accompanying drawings, which are incorporated in and constitute a part of this specification, illustrate embodiments of the invention and, together with a general description of the invention given below, serve to explain the principles of the invention.

SUMMARY OF THE INVENTION

In one embodiment, a navigation system for a lift truck is provided. The navigation system includes an imaging device configured to capture an image representing a view from the lift truck. A location label that includes a location indicia is positioned so that the image captured by the imaging device includes an image of the location label when the lift truck is in proximity to the location label. The navigation system further includes a navigation processor operatively coupled to the imaging device. The navigation processor is configured to determine a location of the lift truck based at least in part on the image of the location label.

In another embodiment, a method of navigating a lift truck is provided. The method includes capturing an image of a view from the lift truck and identifying a location label in the image. A location indicia is detected on the location label and information generated about the location of the label based on the detected location indicia. The method further includes determining a location of the lift truck based at least in part on the generated location information.

DETAILED DESCRIPTION OF EMBODIMENTS OF THE INVENTION

A navigation system for autonomously guiding a vehicle, such as a lift truck, in a warehouse includes a navigation processor coupled to an imaging device. The imaging device is configured to capture and provide images to the navigation processor and captures a view to a side of the lift truck. The images are captured with sufficient frequency so that as the lift truck moves down an aisle, the navigation processor will be able to detect location labels as they come into view of the imaging device. The location labels are affixed at regular intervals on a storage rack to the side of the aisle, and include indicia that provide the aisle and slot number of the storage slot next to the lift truck. The navigation processor decodes the indicia and thereby determines the current location of the lift truck in the aisle.

When the order selector or other worker indicates that an item has been added to the pallet, the navigation processor compares the current location of the lift truck to the aisle and slot number of the next item to be picked. If the next item to be picked is sufficiently close and/or in the same aisle, the navigation system will move the truck autonomously to the location of the next item to be picked so that the order selector can walk along side of the lift truck rather than reenter the lift truck. The navigation system thereby reduces the number of times the order selector must exit and reenter the lift truck, reducing the time and energy expended by the order selector as compared to lift trucks lacking the navigation system. The navigation system also interfaces with a voice-directed system so as to facilitate proper order or task completion. Herein, the worker is indicated as an "order selector" for the tasks of selecting or picking an order to describe embodiments of the invention. It will be readily understood that the worker/user may use the invention for other tasks as well, and therefore, the term "order selector" is not meant to be limiting.

Figures 1, 1A:
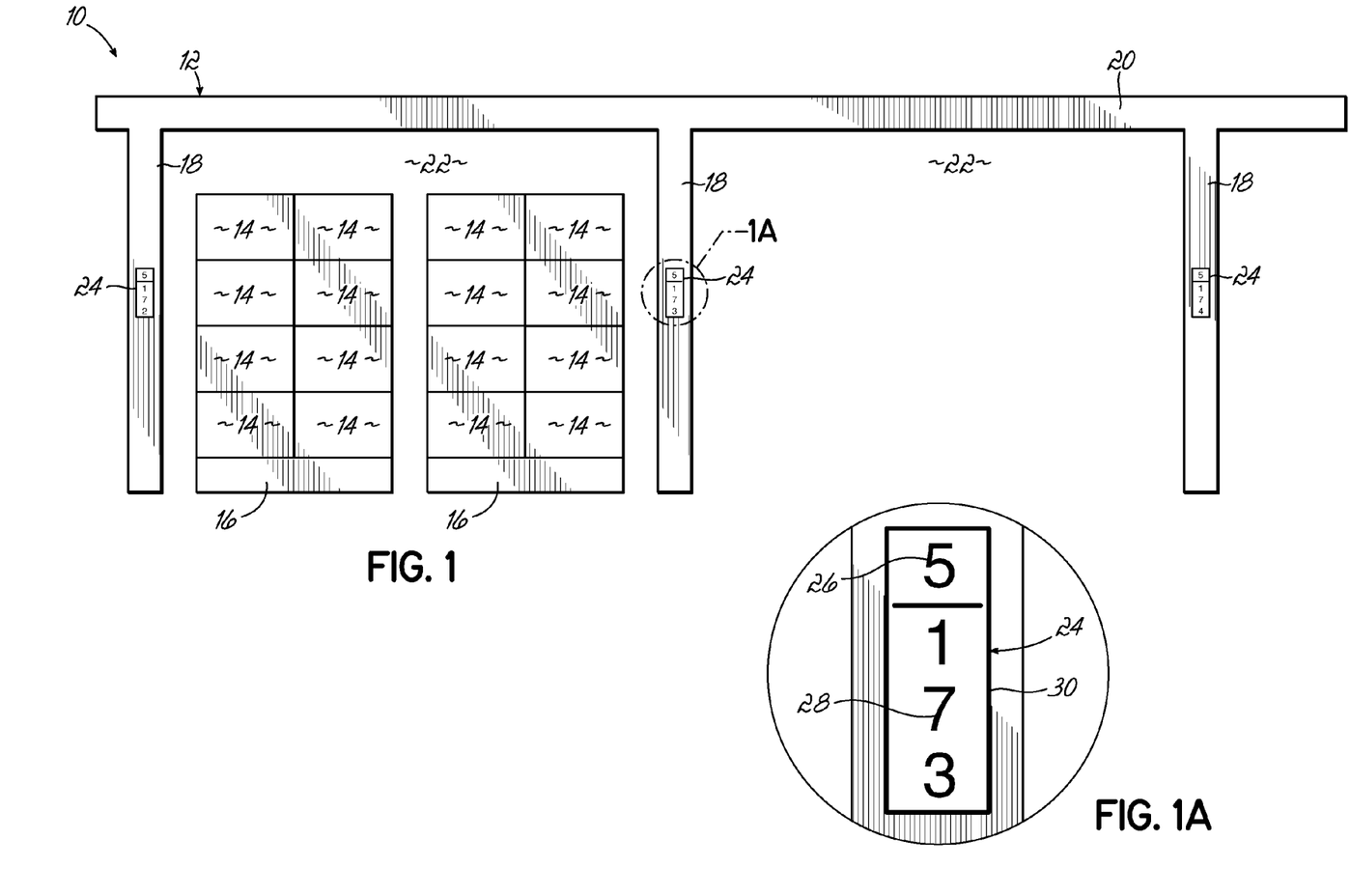
FIG. 1 is a side view of a warehouse rack illustrating a location label as seen from the center of an aisle and in accordance with an embodiment of the invention.
FIG. 1A is an expanded view of a portion of FIG. 1 showing details of the location label.

With reference to FIGS. 1 and 1A, an aisle 10 in a warehouse environment is illustrated including structures, such as racking 12 and inventory items 14, which will typically be sitting on pallets 16. The pallets 16 keep the items 14 off the floor and facilitate moving inventory to different locations within the warehouse. The racking 12 or other structures includes vertical members or uprights 18 and horizontal members or load beams 20 that define a series of adjacent storage areas or slots 22. Location labels 24 are shown affixed to the uprights 18 and include aisle number indicia 26 and slot number indicia 28. The location labels 24 may be printed on inexpensive adhesive backed paper using known methods, such as a laser printer. The location labels may then be affixed to the uprights 18 to provide unique location indicia that identify the locations of the associated adjacent slots 22. Advantageously, the location labels 24 are inexpensive to generate and may be readily updated by simply printing out a new label and affixing it over the label that is to be replaced. Although represented in FIG. 1 as numerals, the location indicia 26, 28 may also be in a machine-readable form, such as a barcode or quick response (QR) code (not shown). Location labels 24 with machine readable indicia will also typically include a human readable form to allow order selectors to visually verify the aisle and slot number of an associated slot 22.

The location labels 24 may also include a readily identifiable target datum 30, such as a bold line surrounding the label, to improve the ability of an image processor to detect the location label 24 within an image. In one embodiment, to further facilitate detection of the location labels 24, the location labels 24 are located at a fixed height from the ground on the uprights 18. However, other configurations may be employed and the invention is not limited to location labels 24 at the same or any particular height.

Figure 2:
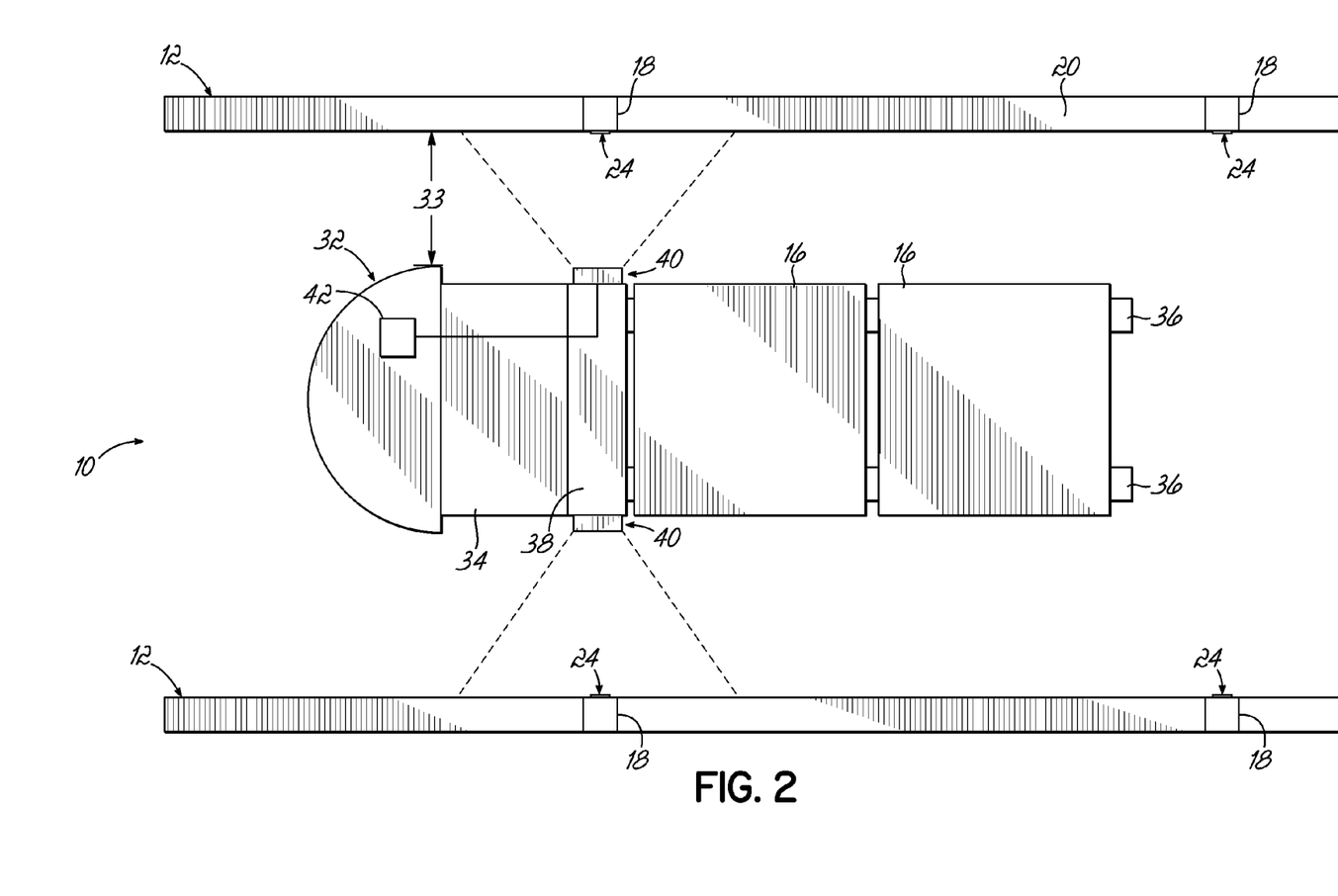
FIG. 2 is a top view of a lift truck showing the relationship between the lift truck and the location label in accordance with an embodiment of the invention.

With reference to FIG. 2 in which like numerals refer to like features in FIG. 1, a top view of the aisle 10 includes a motorized vehicle, such as a lift truck 32, equipped with a navigation system in accordance with an embodiment of the invention. Various other vehicles might be used with the invention. FIGS. 1-2 illustrate a particular style of lift truck known generally as a pallet jack, but the invention equally has applicability to other forms of lift trucks and similar devices as well. As illustrated in FIG. 2, the lift truck 32 is positioned and travels in the aisle 10 at a distance 33 from the racking 12 and includes an operator car and platform 34 driven by an operator, bearer members 36 forming a fork, and a safety barrier 38. Typically, an imaging device 40 will be mounted on each side of the lift truck 32 at about the same height above the floor as the location labels 24 so that the labels 24 on both sides of the aisle 10 may be imaged. However, embodiments of the invention may have any number of imaging devices 40. The imaging devices 40 are configured to capture images representing views from the lift truck 32, such as areas to the sides or front of the lift truck 32 in a line of sight that includes the labels, or any other area in proximity to the lift truck 32. The captured images are provided to a navigation processor 42, which is operatively coupled to the imaging devices 40 though a suitable interface, such as a universal serial bus (USB) or Bluetooth® or other wireless interface. Although the imaging devices 40 are illustrated in FIG. 2 as being mounted to the safety barrier 38, the imaging devices 40 may be mounted anywhere on the lift truck 32 that provides a suitable view of the location labels 24. The imaging devices 40 may be, for example, suitable low cost cameras that provide images in a digital form and of sufficient quality to allow the information on location label 24 to be properly identified and decoded. For example, the imaging devices 40 may be web cameras, or imaging devices specifically designed to capture and decode machine readable labels.

Figure 3:
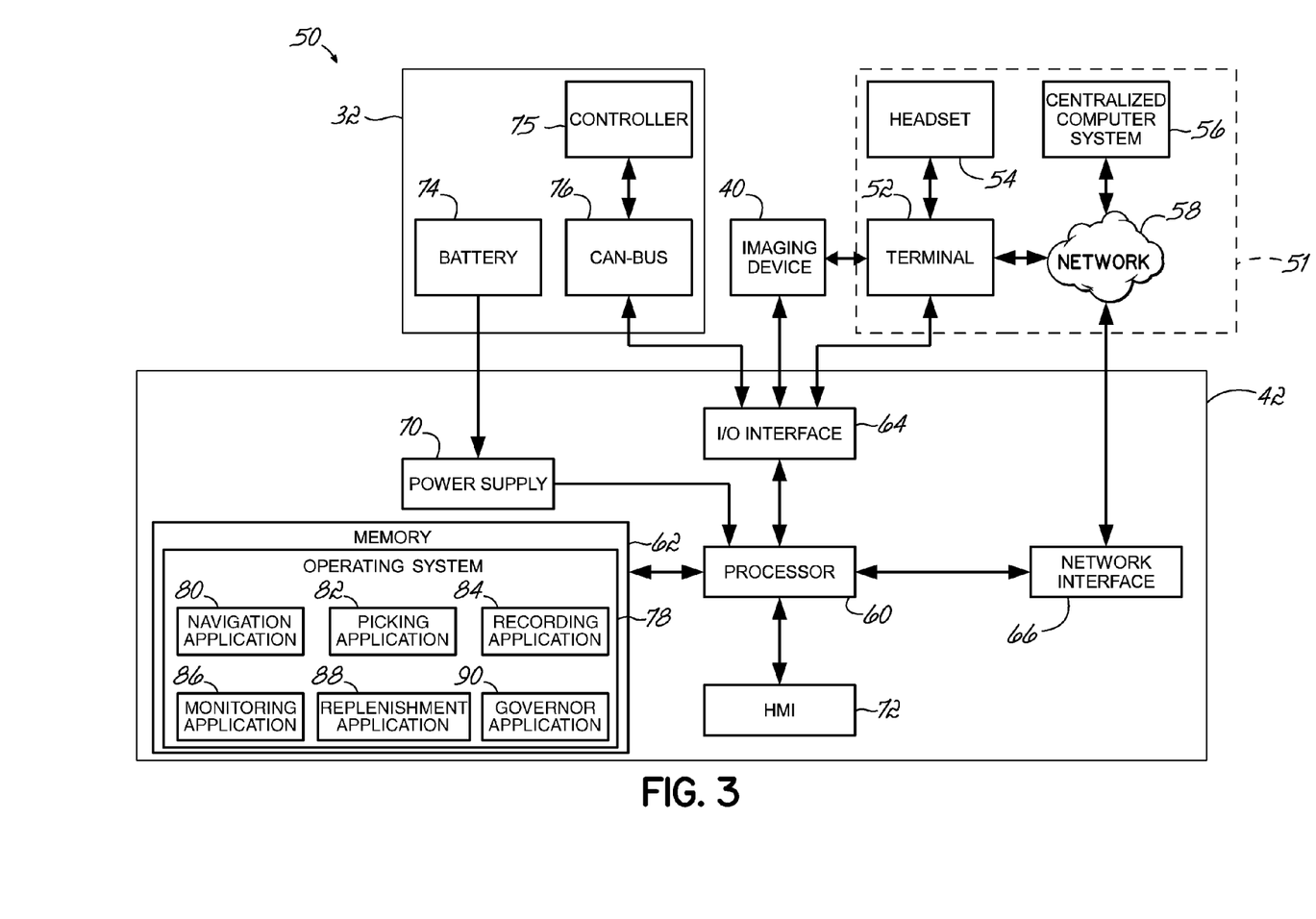
FIG. 3 is a block diagram illustrating the lift truck navigation system in accordance with an embodiment of the invention.

Referring now to FIG. 3, in which like numerals refer to like features in FIGS. 1 and 2, a navigation system 50 includes the imaging device 40 and navigation processor 42. Although the navigation system 50 is illustrated in FIG. 3 in an exemplary deployment with the lift truck 32 and a voice-directed system 51, it is understood that the navigation system 50 may also be deployed with other types of industrial vehicles (e.g., a forklift) and in a non-voice-directed work environment. The voice-directed system 51 is configured for providing a speech dialog with a user and includes a plurality of portable computer devices or terminals 52 each operatively coupled to a headset 54. The terminals and headsets are worn/carried by the order selector or some other user. The terminals 52 communicate with a centralized computer system 56 over a network 58, which allows the terminals 52 to exchange information with a warehouse management system, for example, that is run by the centralized computer system 56. The terminal 52 includes speech recognition and speech synthesis circuitry (e.g., text-to-speech circuitry) so that, through the speech dialog, the voice-directed system 51 may interact with the order selector or user/worker through verbal exchanges and a voice dialog. In one embodiment of the invention, the system 51 is directed to handling items, such as in a warehouse, including picking or obtaining items for an order or replenishing items on a shelf. However, it will be understood that the invention has uses beyond a combination with a voice-directed system. The speech dialog may be directed to the location and handling of one or more items. The order selector or other worker may thereby be provided with voice-synthesized instructions from the terminal 52 via the headset 54, such as a location for the next item to be picked. Likewise, the order selector may respond to the voice-directed system 51 regarding progress in filling the order, such as by notifying the system 51 that a particular item or items have been picked and providing verification that the proper item(s) were picked. Suitable hardware and software for implementing such a voice-directed system is available, for example, from Vocollect, Inc. of Pittsburgh, Pa., including TALKMAN® terminals and supporting hardware and software.

The navigation processor 42 includes a processor 60, a memory 62, an input/output (I/O) interface 64, a network interface 66, and a power supply 70. Although the navigation processor is illustrated herein as a separate device, it could be implemented in an existing device such as the terminal 52. Therefore, the invention is not limited to a specific defined hardware arrangement for implementing the features of the invention. Although the navigation processor 42 may be strictly an embedded device that is not affected or accessed by an operator, an alternative embodiment might include a human machine interface (HMI) 72 that could be used to allow the operator some control or ability to directly access the processor 42 and the system. The navigation processor 42 is typically mounted to the lift truck 32, which may provide power via a lift truck battery 74 electrically coupled to the processor 60 through the power supply 70. The power supply regulates the voltages supplied by the lift truck battery 74 and provides suitable voltages to the electrical components of the navigation processor 42. The navigation processor 42 may also communicate with a controller 75 in the lift truck 32 though an industry standard vehicle bus or other suitable communications interface, which is operatively coupled to processor 60 through the I/O interface 64. As illustrated in FIG. 3, one such suitable vehicle bus commonly used to provide communication between vehicle components is a Controller Area Network bus, or CAN-bus 76. If the navigation processor is implemented in a voice terminal 52, the voice terminal might include the imaging device and be mounted on the lift truck. In such a case, the link between the terminal and a headset worn by a user would desirably be a wireless link, such as a Bluetooth® link, for example.

The processor 60 may consist of one or more processors selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in memory 62. The processor 60 is operatively coupled to the I/O interface 64 and the network interface 66 for allowing the processor to interact with other system components and system users. As noted above, an HMI 72 may provide additional interaction. The I/O interface 64 employs one or more suitable communication protocols for communicating with at least the imaging device 40, terminal 52, and CAN-bus 76. Similarly, the network interface 66 employs one or more suitable communication protocols for communicating over the network 58, such as IEEE 802.11 (Wi-Fi). In one possible embodiment, the HMI 72 provides a mechanism by which a system user may interact directly with the navigation processor 42. To this end, the HMI 72 may include output devices, such as an alphanumeric display and/or a touch screen, and input devices such as an alphanumeric keyboard or touch screen capable of accepting commands or input from the operator and transmitting the entered input to the processor 64.

Memory 62 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing digital information. Memory 62 may also include memory storage physically located elsewhere in the navigation processor 42, such as memory integrated with the processor 60 and/or a mass storage device (not shown).

The navigation processor 42 may be under the control and/or otherwise rely upon various software applications, components, programs, files, objects, modules, etc. (hereinafter, "program code") residing in memory 62. This program code may include an operating system 78 as well as one or more software applications such as a navigation application 80, a picking application 82, a recording application 84, a monitoring application 86, a replenishment application 88, as well as other applications, as discussed below. The various applications may be associated with various different processes for item handling and processing in a warehouse, for example, and might be associated in that sense with a sequential flow or "item order" that defines the order or sequence of the handling/processing of items. The applications 80, 82, 84, 86, 88 may be configured to run on top of operating system 78 or directly on the processor 60 as a "stand-alone" application. Furthermore, one or more of the noted applications might include program code executed on another of the system components having a processor, such as terminal 52 or centralized computer system 56.

The navigation application 80 may be configured to capture images from the imaging device 40 and search the captured images for location labels 24. The images may be captured at a sufficient frame rate to allow the navigation application 80 to detect and respond to information contained on the location labels 24 in a timely manner. The desired frame rate may therefore depend on the maximum operating speed of the lift truck 32—i.e., faster maximum operating speeds may require higher frame rates to allow a sufficiently short response time by the navigation application 80. In response to detecting the location label 24, the navigation application 80 may analyze the location label 24 and extract information regarding the location of the lift truck 32 in terms of an aisle and slot number. This analysis may include character recognition and/or decoding of machine readable indicia such as bar codes included on the location label 24.

The navigation application 80 may also determine the distance 33 between the lift truck 32 and the racking 12 by analyzing the angular size of the label 24 and/or target datum 30 in the captured image. This distance determination may be made by comparing the dimensions of the imaged label 24 with known sizes of the label 24 and/or target datum 30. For example, the navigation application 80 might determine the number of pixels for a known dimension of the location label 24 such as an area or width. The navigation application 80 might then use a lookup table or a formula stored in memory 62 to determine the distance 33 from the imaging device 40 (and side of the lift truck) to the racking and labels 24 based on the number of pixels. The determined distance 33 may be used alone or in conjunction with aisle and slot location information to adjust the steering and movement of the lift truck 32 to maintain the position of the lift truck 12 within the aisle 10. For example, the lift truck 32 might be steered, moved, and maintained near the center of aisle 10 in aisles configured for one-way traffic, or between the racking 12 and a center median of the aisle 10 for aisles configured to support two-way traffic. The truck 32 is also maintained a suitable distance 33 so as not to hit the racking 12. For two way traffic, an imaging device 40 may only be used on one side of the lift truck 32 and labels 24 only applied to one side of each aisle 10. Alternatively, to handle one way traffic where the picking application asks the selector to pick either from the right rack or left rack, imaging devices 40 may be used on both sides of the truck 32 and labels 24 applied to both sides of the aisle 10 as shown in FIG. 2. Alternatively, if only a single imaging device 40 is used for one way traffic and picking, one or both sides of the aisle 10 may be provided with labels 24, and the inventory or warehouse map available from the centralized computer system may be used to determine the location of a slot that is directly across the aisle from the slot where the label is captured. For example, if slot 102 is the destination, the imaging device might capture a label for slot 101 and the system would know that slot 102 is directly across from slot 101.

The navigation application 80 may control the movement of lift truck 32 through an ISO-11898 compatible serial port in the I/O interface 64. The serial port may be operatively coupled to the CAN-bus 76 of lift truck 32 through a wired connection, or may include a short range wireless link such as a Bluetooth® link, for example. In cases where a Bluetooth® link is employed, a commercially available Bluetooth® to CAN-bus adapter (not shown) may be used to complete the connection between the processor 60 and the CAN-bus 76. The CAN-bus 76 thus provides an industry standard communication link between the processor 60 and the controller 75 of lift truck 32. The navigation application 80 may thereby control the speed and direction of the lift truck 32 by issuing commands to and receiving messages from the lift truck controller 75 through the CAN-bus 76.

The navigation application 80 may communicate with the terminal 52 over a Bluetooth® or other suitable wireless or wired link provided by the I/O interface 64. In some embodiments, the navigation application 80 may also communicate with the terminal 52 through the network 58. Terminal 52 may be part of a voice-directed system that is configured to provide the order selector with voice instructions through the headset 54. To this end, the terminal 52 will typically run one or more tasks or work applications that use a list of items to be assembled into an order. Such tasks or work applications may be provided by the centralized computer system 56, which may include a terminal management computer. In response to the order selector confirming that the previous item has been picked, the terminal 52 may direct the order selector to the next item 14 that is to be loaded onto the pallet. Because the terminal 52 has location information on the items 14 being picked, the navigation application 80 may obtain information regarding the next item to be picked via the terminal 52.

In one aspect of the invention, the voice-directed system is configured for communicating with the navigation processor and vice versa for controlling movement of the lift truck based on the location of items in the warehouse for processing the items. The centralized computer system 56 may be used to track and manage inventory for the warehouse, and may communicate with the terminal 52 and navigation processor 42 over the network 58. The centralized computer system 56 and any related terminal management computers may thereby provide order lists to the terminal 52 as well as track put-away tasks and picking tasks so as to maintain an up-to-date inventory list including item and slot location information. The centralized computer system 56 may also provide an inventory map to the navigation processor 42 that associates each inventory item 14 with a slot and aisle number. The inventory map may include the aisle and slot number for each item 14 currently in inventory, or may be limited to information regarding the locations of items 14 in the aisle 10 where the lift truck 32 is currently located (e.g., a slot map). The inventory map may be stored in memory 62, or may be stored on the centralized computer system 56 and accessed as needed by the navigation processor 42. The navigation system 50 and voice-directed system 51 may thereby form an integrated system that allows the navigation system 50 to leverage the capabilities of the voice-directed system 51 and improve warehouse operational efficiency.

In operation, as the lift truck 32 moves down an aisle, the imaging device 40 captures a sequence of images in a continuous fashion. These images are provided to the navigation processor 42 in a suitable video or image format, such as a Moving Pictures Experts Group (MPEG) video, as a series of raw image files, bit maps, Joint Photographic Experts Group (JPEG) formatted images, or in any other suitable digital image format. Each image received by the navigation processor 42 is analyzed by the navigation application 80, which searches the images for location labels 24. When a location label 24 is in the field of view of the imaging device 40, the navigation application 80 decodes the location information contained in the label. The navigation application 80 may thereby determine location of the lift truck 32 by aisle and slot number. The navigation application 80 may also determine the position of the lift truck 32 within an aisle based on the apparent size and position of the location label 24 as it appears in the image. For example, the position of the location label 24 in the captured image may be compared to a predefined location in the image, such as the center of the image. Based on the distance between the predefined location and the location label 24, the navigation application 80 may fine tune the location of the lift truck 32. The navigation application 80 may also determine the speed of the lift truck 32 by comparing the positions of the location labels 24 in consecutive images. Using the lift truck location and speed information coupled with information about the next item to be picked, the navigation application 80 may autonomously move and steer the lift truck 32 down the aisle 10 to a specific slot 22 while maintaining a specified distance from the racking 12. The pallets 16 may thereby be automatically placed in front of the next slot 22 from which items 14 are to be picked without the order selector having to reenter the lift truck 32.

Figure 4:
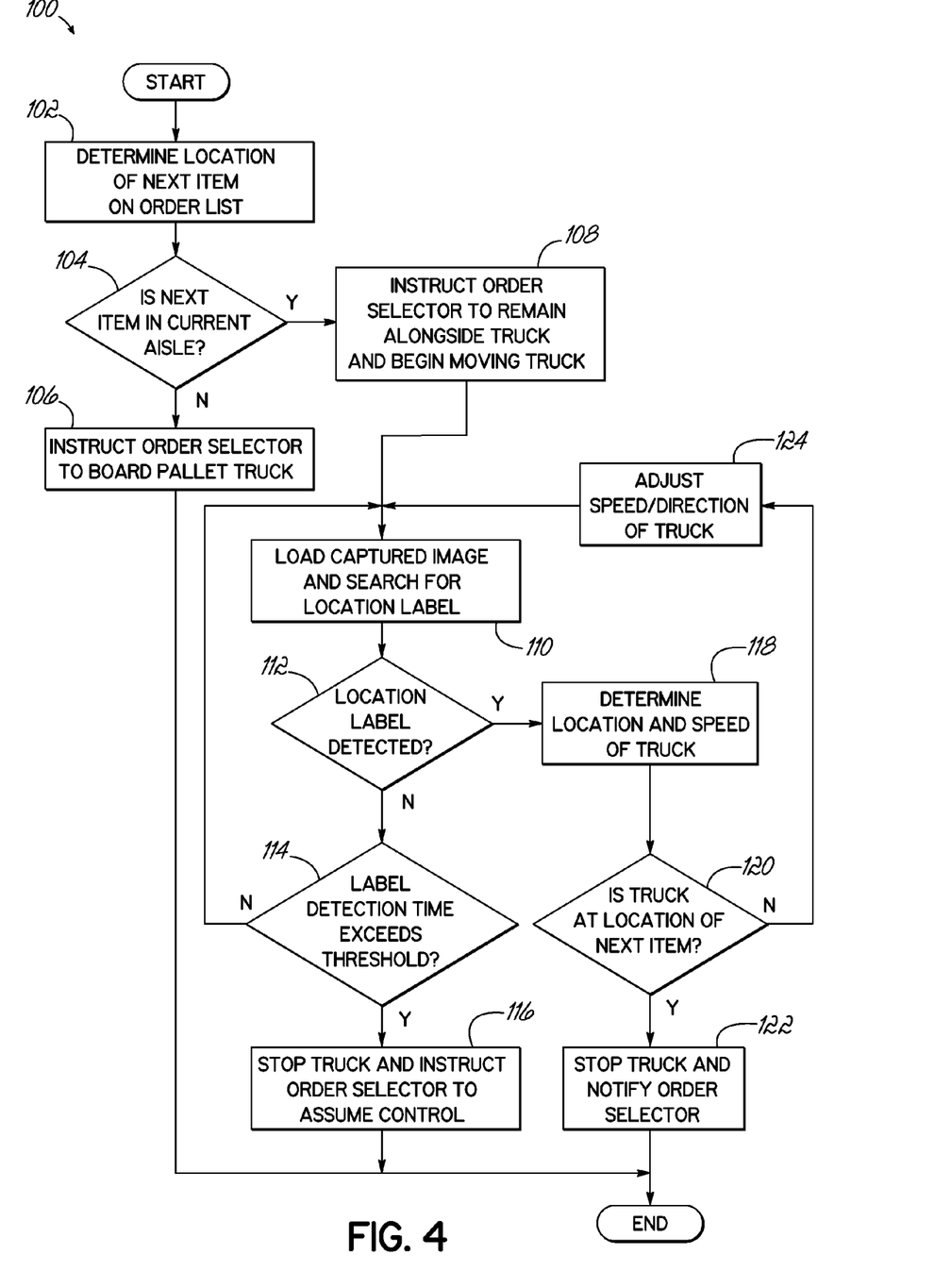
FIG. 4 is a flow chart illustrating one method by which the navigation system in FIG. 3 autonomously manages movement of the lift truck in accordance with an embodiment of the invention.

Referring now to FIG. 4, a flow chart 100 is presented that illustrates one aspect of the operation of navigation application 80 in accordance with an embodiment of the invention wherein an item picking process is implemented. As the lift truck 32 moves about the warehouse, the navigation application 80 captures images and decodes location labels 24, thereby tracking the current location of the lift truck 32. To start the process, an order selector may drive the truck 32 to a particular aisle and slot to select an item from a defined item order or picking order for example. When the lift truck 32 approaches the slot 22 where an item 14 from a particular item order is located, the order selector stops the lift truck 32 so that the pallet 16 is adjacent to the slot 22 containing the item 14 in question for an item order or picking order and the imaging device 40 is in a position to capture images that include the location label 24 of the slot. The order selector may then exit or step off of the lift truck 32, pick the item 14 from the slot 22 and place it on the pallet 16.

The order selector may then confirm that the item 14 has been picked by speaking into the headset 54. In response, the terminal 52 recognizes that the item 14 has been added to the order and presumably the pallet 16, and selects the next item 14 for the item order or the next item on the order list or pick list. The navigation application 80 obtains or is provided with the location of the next item 14 that is specified to be picked in the item order. The picking application 82 could be resident in processor 42, or more typically, will be run by the terminal 52, and thus, the terminal provides the location information. The navigation application 80 then uses the location information and determines the location of the next item 14 in the item order based on the inventory map (block 102). The item location is then evaluated with respect to the current location of the lift truck 32.

In block 104, the navigation application 80 determines if the next item 14 of the item order to be picked is in a slot 22 in the current aisle 10 where truck 32 is located. If the next item 14 is not in the current aisle, or is otherwise determined to be too far away ("No" branch of decision block 104), the navigation application 80 may proceed to block 106, where the order selector is instructed to board the lift truck 32. In accordance with one aspect of the invention, the navigation processor is integrated with the voice-directed system to provide speech instructions to a user regarding interacting with a vehicle. The navigation application interfaces through the speech dialog of the picking application or other speech-directed application to instruct the worker by speech to board the lift truck to drive to the aisle and slot where the item is located. The lift truck 32 may then be driven to the location of the next item 14 by the order selector. In an alternative embodiment, the lift truck (with the order selector/user on board) may be moved to the next location autonomously by the navigation application 80, such as if the next item 14 is in the current aisle 10, but is determined to be too far away in the aisle for the selector to walk. The navigation application 80 can make the determination of whether the worker can walk or should ride or drive to the next slot depending on the distance to the next slot, and provides speech instructions to a user accordingly.

If the item 14 is determined to be in the current aisle ("Yes" branch of decision block 104) and is not too far away down the aisle, the navigation application 80 may proceed to block 108, where the navigation application 80 instructs the order selector verbally or otherwise to remain alongside of the lift truck 32 and begins autonomously moving the lift truck 32 toward the location of the next item 14 to be picked. The navigation application 80 may provide instructions to the order selector through the terminal 52, which uses a text-to-speech (TTS) engine to play the instructions through the headset 54 as synthesized speech. By way of example, the terminal might speak a message such as "Walk to slot 8" to notify the order selector that the lift truck will move autonomously to the next slot.

In block 110, as the truck moves, the navigation application 80 loads captured images of the view at the side of the lift truck 32 and searches the images for a location label 24. The navigation application 80 may identify the location label 24 within the captured image by recognizing the target datum 30 and/or location indicia 26, 28. If a location label 24 is not detected in the captured image ("No" branch of decision block 112), the navigation application 80 may proceed to block 114.

In block 114, the navigation application 80 determines how much time or distance has passed since a location label 24 has been detected. If the time or distance since the last location label detection exceeds a safety or accuracy threshold, the navigation application 80 may determine that it has insufficient data to accurately know the current position of the lift truck 32. In this case, the navigation application 80 proceeds to block 116 ("Yes" branch of decision block 114) and stops the autonomous movement of the lift truck 32. The order selector is then verbally or otherwise instructed to board the lift truck 32 and reassume control by driving the lift truck 32 to the location of the next pick item. If the time since the last location label detection does not exceed the safety or accuracy threshold, the navigation application 80 may return to block 110, where another image is captured and the detection process repeated. If a location label is detected ("Yes branch of decision block 112) the navigation application 80 proceeds to block 118.

In block 118, the navigation application 80 determines the location and speed of the lift truck 32. The location of the lift truck 32 within the warehouse may be determined by decoding the aisle and slot numbers 26, 28 as described with respect to FIG. 3. This location may be further refined to more precisely locate the lift truck 32 within the aisle 10 by analyzing the size and position of the location label 24 within the captured image. Because the location labels 24 have a known size, the navigation application 80 may use the size of the image of the location label 24 to determine the distance between the lift truck and the racking 12 that defines a side of the aisle 10. The position of the location label 24 within the image may be used to further refine the location of the lift truck 32 along the length of the aisle 10. In particular, the position of the location label 24 in the image frame might be used to fine tune the position of the truck pallets 16 in front of a destination slot 22 by moving the lift truck 32 forward or backwards slightly to center the location label 24 in the image frame. The location of the lift truck 32 may thereby be accurately determined by analyzing the location label 24 as it appears in the captured image. To further aid in navigation, the shape of the label in the image frame may be used to determine the angle of the truck as compared with the longitudinal axis of the aisle. For example, if the selector parks the truck at an angle to the desired direction of travel, the navigation processor can more readily provide appropriate steering commands to the truck.

The navigation application 80 may also determine the speed of the lift truck 32 by comparing the location of the location label 24 in consecutive images. The change in the position of the location label 24 from one frame to the next provides an indication of the distance travelled between the time at which the first frame was captured and the time at which the second frame was captured, and the distance there between. Thus, by knowing the times at which the first and second frames were captured, the navigation application 80 may independently determine the speed of the lift truck 32. For imaging devices 40 that use a rolling shutter (i.e., a shutter that scans across the frame either vertically or horizontally), the speed of the lift truck 32 may also be determined by determining an amount of smear or skew in the captured image.

In block 120, the navigation application 80 compares the current location of the lift truck 32 to the known location of the next item 14 to be added to the pallet 16. If the lift truck 32 has reached the slot 22 where the next item 14 to be picked is stored ("Yes" branch of decision block 120), the navigation application 80 may proceed to block 122 and stop the lift truck 32. Once the lift truck 32 has stopped, the navigation application 80, through the voice-directed system, may notify the order selector verbally or otherwise that the pallet 16 is in position in front of the slot 22 and ready to be loaded. That is, speech instructions are provided, based on the determined location, for the user to process one or more items. The order selector may then pick the item 14 and load it onto the pallet 16, at which point the order selector confirms verbally that the item 14 has been picked so that the next item 14 may be identified and the process repeated. If the lift truck 32 has not reached the slot 22 where the next item 14 to be picked is stored ("No" branch of decision block 120), the navigation application 80 may proceed to block 124.

In block 124, the navigation application 80 adjusts the speed and direction of the lift truck 32 based on its current location and speed as well as the location of the next item to be picked. For example, if the navigation application 80 determines that the lift truck 32 is too far from the racking 12, the navigation application 80 might issue steering commands to the lift truck controller 75. These steering commands would cause the lift truck 32 to change direction to maintain the desired distance between the lift truck 32 and the racking 12. As another example, the navigation application 80 may compare the current location of the lift truck 32 to the location of the item to be picked as indicated by the inventory map. If the lift truck 32 is approaching the slot 22 where the item 14 is stored, the navigation application may issue commands to the lift truck controller 75 to reduce the speed of the lift truck 32. The speed of the lift truck 32 might thereby be reduced in anticipation of reaching the destination slot 22. The navigation application 80 might cause the lift truck 32 to decelerate gradually as it approaches the destination slot 22 to avoid abrupt changes in speed. Advantageously, by avoiding abrupt changes in speed, the navigation system 50 may thereby increase safety and conserve lift truck battery power. The navigation application 80 might also adjust the speed of the lift truck 32 in anticipation of reaching a cross aisle or other traffic control point. Once the desired adjustments have been made to the speed and direction of the lift truck 32, the navigation processor 80 may proceed to block 110 and obtain the next image so that sequentially captured images are obtained continuously as the lift truck 32 moves about the warehouse.

The navigation system 50 thus determines the current speed and location of the lift truck 32 by analyzing a series of sequentially captured images that include location labels 24 in the frame. The current location and speed of the lift truck 32 may be compared to a digital map of the truck's operating environment (e.g., the warehouse configuration and/or the inventory map) and the known location of the truck's destination (e.g., the slot 22 where the next item 14 is to be picked) to control or manage the movement of the lift truck 32. The digital map may be stored in memory 62, obtained from the centralized computer system 56, and/or obtained from the terminal 52. Information concerning the destination of the lift truck 32 may also be obtained from the centralized computer system 56 and/or terminal 52 and stored in the navigation processor 42.

Specific examples of movement management which may be performed by the navigation system 50 include, but are not limited to: (1) determining an appropriate trajectory for moving the lift truck 32 between slots 22 (e.g., by selecting acceleration and braking rates based on the distance between the departure and the destination slots 22); (2) automatically stopping the lift truck 32 at cross aisles and waiting for the order selector to confirm the way is clear before proceeding; (3) deciding when to move autonomously based on the distance and/or direction to the next stop; and (4) positioning the lift truck 32 to block access to incorrect slots 22 to reduce the chance that an order selector will load an incorrect item.

Additional embodiments of the navigation system 50 may include location labels 24 placed at various locations in the warehouse to allow the navigation system 50 to autonomously move the lift truck 32 in areas outside of an aisle 10. For example, location labels 24 might be placed on vertical members of the racking 12 at the end of an aisle 10, with the labels facing outward into a cross aisle. These additional location labels 24 would provide location information to allow the navigation system 50 to manage movement of the lift truck 32 outside the confines of an aisle 10. The additional navigational abilities provided by having location labels 24 placed throughout the warehouse might enhance capabilities of the navigation system 50 so that the lift truck 32 could be operated autonomously throughout the warehouse.

By way of example, a dispatch operator might send an autonomously navigated lift truck 32 off to a particular slot 22 where an order selector is stationed to load the pallet 16. Thus, a lift truck 32 equipped with the navigation system 50 might allow implementation of a pick-and-pass order filling system. To this end, the warehouse might be segregated into pick zones and an order selector positioned within each zone. This arrangement would allow order selectors to load lift trucks 32 as they arrived in the order selector's zone rather than following around a particular lift truck 32. Advantageously, order selectors would not be required to spend time traveling from one zone to another on the lift truck 32 and could thus fill orders more efficiently. More advantageously, the navigation system 50 might thereby allow a pick-and-pass order filling system to be implemented in an existing warehouse without the need for conveyer belts or other expensive order container moving equipment. The location information obtained by the navigation system 50 might also be used for functions other than autonomously moving the lift truck 32. For example, the navigation system 50 and components thereof could also be used improve the accuracy with which orders are filled by verifying that a pick is coming from the correct aisle 10 and slot 22.

Generally, in voice-directed warehouse management systems, verification is used in the performance of tasks to insure that the workers are at the proper location in order to pick an item and also to replenish items. As discussed below, verification is often provided by spoken information, such as spoken "check digits". However, in accordance with one aspect of the present invention, the location information that is determined by the imaging device 40, or from a larger navigation system, may be used to provide location verification. For example, the imaging device 40 and any processing circuitry 42 might report location information through an interface, such as a Bluetooth® interface to an order selector's terminal 52. The Bluetooth® interface may provide a direct link between the terminal 52 and imaging device 40, or the link may be provided through the I/O interface 64 of the navigation processor 42. The terminal 52, then running a particular picking application, can verify that the location information provided matches up with the location information where the selector is supposed to be, and where the item of interest is supposed to be located. In that way, location information is provided separately, rather than from the spoken verification of the selector, and may be used to verify that the pick or other task is being performed correctly. Alternatively, as discussed below and referred to in FIG. 5, the location information that is provided in accordance with the invention might be utilized in addition to other verification methods, such as the speaking of check digits, in order to verify the proper performance of a task.

Figure 5:
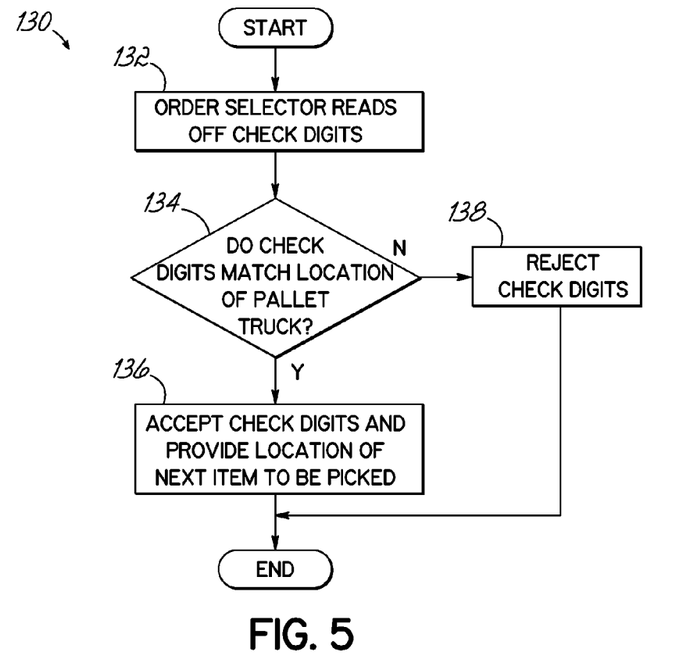
FIG. 5 is a flow chart illustrating one method by which the navigation system in FIG. 3 verifies a pick in accordance with an embodiment of the invention.

Referring now to FIG. 5, a flow chart 130 illustrates another such process for verifying a pick using the imaging device and/or navigation system of the invention. In block 132, the voice-directed system obtains verification information wherein the order selector notifies the voice-directed system 51 that they have picked an item 14 and verifies that the correct item was picked. In one example, the user provides the verification information such as by reading off check digits that are printed at the slot to identify the slot or item. The spoken check digits are translated into a machine readable form, such as text data, by the terminal 52. The check digit data may be provided to the picking application running on terminal 52, running on the navigation processor 42 (as illustrated in FIG. 3), or on the centralized computer system 56, or on any other suitable computer. If the correct check digits are read, the application can proceed to the next item. One problem with current voice-directed systems is that the workers may memorize the check digits associated with a particular slot, and speak the check digits to the application before they actually arrive at the slot location to read the check digits. The present invention provides verification of location to prevent such a practice.

In block 134, the expected location of the item 14 or slot 22 that correlates to check digits provided by the order selector is compared to the location of lift truck 32 as determined by imaging device 40 and/or the navigation system 50. If the check digits correlate with the captured location information, as determined by the imaging device 40 reading a location label 24, or correlate with the location of the lift truck 32 determined through the navigation system ("Yes" branch of decision block 134), the picking application 82 proceeds to block 136. In block 136, the picking application 82 accepts the digits (if they are otherwise correct for the location) and provides instructions that direct the order selector to the next item to be picked. Depending on the relative locations of the lift truck 32 and the next item 14, the navigation system 50 may also autonomously move the lift truck 32 as previously described with respect to FIG. 4.

If the check digits do not correlate with the location of the lift truck 32, as seen by the lift truck imaging device 40 or indicated by navigation application 80 ("No" branch of decision block 134), the picking application 82 may proceed to block 138 and reject the spoken check digits. A mismatch between the spoken check digits and lift truck location may occur because the order selector has not reached the slot 22 where the item is stored with the truck, and is pre-reporting a pick in an attempt to speed up the picking process, as noted above. A mismatch may also occur because the order selector has picked an incorrect item or has misread the check digits for another slot, different from the slot where the truck is located. In either case, the picking application 82 requires that the error be corrected before allowing the pick to continue. In one embodiment, as shown in FIG. 5, the speech dialog will ask for and receive the spoken check digits, and then compare the current location with the location corresponding to the check digits in order to verify the worker's location. In another embodiment, the location information, as determined by embodiments of the invention, may actually affect the speech dialog in a speech-directed system, and may prevent the worker from even speaking or entering any check digits or other verification information in the speech dialog until the selector arrives at the proper location, and the location is verified.

The lift truck location determined by the imaging device 40 or navigation system 50 may thus be used to verify location through the terminal 52 to verify that the order selector is providing accurate information to the voice-directed system 51. Advantageously, the navigation system 50 may thereby be used to improve the accuracy of order picking as well as to prevent cheating by order selectors who have memorized check numbers.

Although the navigation system disclosed herein for moving a lift truck autonomously through a workspace may provide the necessary location information for verification of the proper performance of a task, an alternative embodiment of the invention may not provide autonomous movement of a lift truck. Rather, the location information as provided by an imaging device 40, and/or any processing hardware 42 might simply be utilized to provide an indication of the location of the truck and the worker associated therewith. Therefore, the location verification feature of the invention may be provided without navigation of the lift truck.

Figure 6:
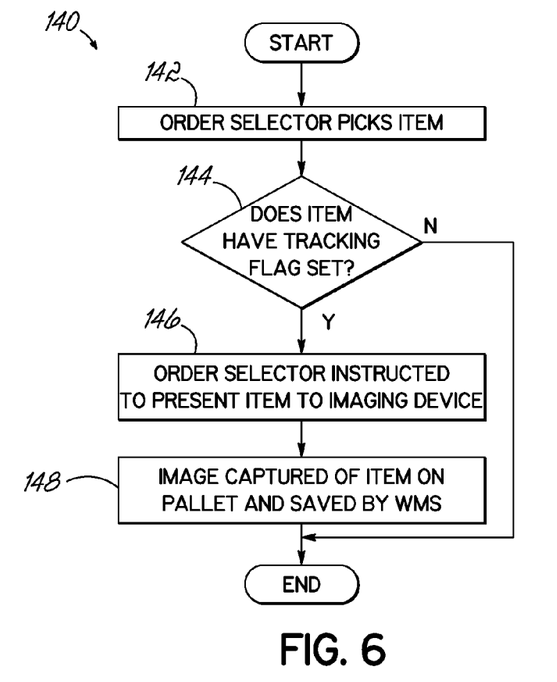
FIG. 6 is a flow chart illustrating one method by which the navigation system in FIG. 3 captures a record of an order in accordance with an embodiment of the invention.

Referring now to FIG. 6, flowchart 140 illustrates a process whereby the location information obtained by the invention may also be used to provide a video record of an order. For example, it may be desirable to record further information and video about an order because the items that are being picked are particularly valuable, and thus, more important for the purposes of order accuracy. In block 142, the order selector picks an item 14. The order selector may inform the voice-directed system 51 that an item is being picked in the conventional manner by reading check digits into the headset 54.

In block 144, a recording application 84 determines if the item that was picked is flagged as an item that should be further tracked or recorded. The recording application 84 may be running on the navigation processor 42 (as illustrated in FIG. 3), on the terminal 52, on the centralized computer system 56, or on any other suitable computer. The tracking flag status may be set for a particular item based on: (1) the value of the item, (2) the customer to which the item is to be shipped (e.g., a customer who has a history of reporting missing items), (3) the item being a high theft item, and/or for any other reason or combination of reasons. If the tracking flag is set ("Yes" branch of decision block 144), the recording application 84 may proceed to block 146.

In block 146, the order selector may be verbally instructed to present or otherwise position the item 14 so that it is in view of the imaging device 40, another imaging device on the truck, or an imaging device on the headset 54. Once the item 14 is in place or presented for recording, the selector may notify or command the recording application 84 by speaking into the headset 54. In block 148, the recording application 84 captures an image of the item 14. The image capture may be automatic once the items are indicated as in position, or the selector may be required to speak a command for the imaging device to capture an image or take a picture. This image may be saved to provide a record that the item 14 was included in the order. If the tracking flag is not set ("No" decision branch of decision block 144), the normal order filling process may continue without any intervention by the recording application 84.

To facilitate the recording feature of the invention and the operation of recording application 84, one or more additional imaging devices 40 may be mounted to the lift truck 32 at other locations to provide a continuous view of the pallets 16 and/or to monitor loading. These additional imaging devices 40 might be configured to provide images of the pallet 16 or other areas around the lift truck 32, such as back alongside the truck, to facilitate recording order picks. Digital images or video captured by the one or more imaging devices 40 might also be automatically retained and stored in a mass storage device in the processor circuitry 42 and/or periodically uploaded to the centralized computer system 56 to provide a record of items that were assembled into an order. Such a record could be used to verify that a particular item was included in a shipment if delivery is contested by a customer, to reduce theft, and to provide a method for locating lost items 14.

The location information provided by embodiments of the invention may also be used for purposes other than facilitating order picking, such as to improve employee performance monitoring. Because the navigation system 50 provides real-time or near-real-time information on the location of the lift truck 32, the navigation system 50 may determine travel time between slots (i.e., time the lift truck is in motion) and distinguish the travel time from non-travel time (i.e., time when the lift truck is stationary). Advantageously, this might allow the navigation system 50 to determine if the order selector is taking unauthorized breaks and/or making up time by operating the lift truck 32 above a safe speed. This functionality might be provided by an application that monitors the time it takes to complete each task assigned by the voice-directed system 51 and compares the actual times to the expected times.

Figure 7:
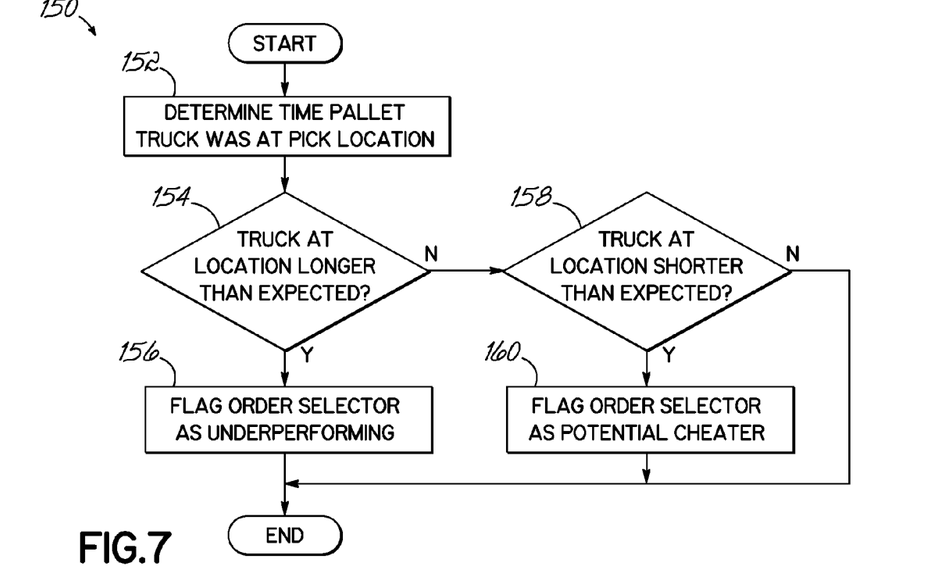
FIG. 7 is a flow chart illustrating one method by which the navigation system in FIG. 3 monitors employee performance in accordance with an embodiment of the invention.

Referring now to FIG. 7, flowchart 150 illustrates a process whereby the information obtained by the navigation system 50 may be used to monitor the performance of an order selector. In block 152, a monitoring application 86, which may be running on the navigation processor 42 (as illustrated in FIG. 3), on the terminal 52, on the centralized computer system 56, or on any other suitable computer, determines the amount of time the lift truck 32 was stationary at the last pick location. This determination may be made based on location information provided by the navigation system 50. To this end, the navigation system 50 may be configured to provide location and/or time information to the monitoring application 86 in response to the lift truck moving toward the next pick location or slot 22. The navigation system 50 may thus enable comparisons between the time the lift truck 32 was at the pick location and the expected time required for the pick.

In block 154, the monitoring application 86 makes a determination as to whether the actual pick time exceeded the maximum allowable or expected pick time value or range of values. Based on the size, weight and number of items picked, the monitoring application 86 may have an expected range of time values that the pick should have taken. The maximum expected pick time could also be empirically determined using pick time data obtained from the navigation system 50 for similar picks performed in the past. An average and standard deviation for the amount of time similar picks have taken previously could then be determined and used to create a lookup table or other suitable database of pick times. To further improve the accuracy of the employee monitoring program, these pick statistics could be classified by order selector experience or associated with a particular order selector. The maximum expected pick times could thereby be customized to account for differences in the skill levels of the order selectors. If the monitoring application 86 determines that the pick took longer than the maximum expected time ("Yes" branch of decision block 154), the monitoring application 86 may proceed to block 156 and flag the order selector as underperforming. If the monitoring application 86 determines that the pick did not take longer than expected ("No" branch of decision block 154), the monitoring application 86 may proceed to block 158.

In block 158, the monitoring application 86 makes a determination as to whether the actual pick time was less than the minimum allowable or expected pick time value. Similarly as described with respect to block 154, the minimum expected pick time might be based on the size and number of items picked, empirically determined from historical data on similar picks, and/or adjusted based on the employee skill level. If it is determined that the pick took less than the minimum expected amount of time ("Yes" branch of decision block 158), the monitoring application 86 may proceed to block 160, where the order selector is flagged for cheating. Cheating typically involves skipping certain order picking steps to speed up the picking process. Examples of cheating include, but are not limited to: (1) scanning an item multiple times before picking the order rather than scanning the items as they are loaded onto the pallet 16; (2) indicating the last assigned task is complete (such as by speaking "ready" into the headset 54) before the task is in fact complete; and/or (3) confirming check digits from memory before arriving at the destination slot 22. Of course, if the pick took less time than the minimum expected time, it might also be associated with an unintentional error by selector such as if less items were picked than the system instructed. Therefore, the information associated with a quick pick may be used as appropriate to evaluate the selector. If the monitoring application 86 determines that the pick did not take less than the minimum expected time ("No" branch of decision block 158), then the monitoring application 86 may proceed to monitor the next task without setting either the underperformance or the cheating flags.

The employee performance flags may have multiple severity levels depending on the length of time by which the pick either exceeded or fell short of the expected time. The employee monitoring system could also be configured to require multiple flag setting events within a certain amount of time to trigger a report to a supervisor. Thus, it is understood that many uses of the performance monitoring functions will be apparent to those having skill in the art of human resource management, and embodiments of the invention are not limited to any particular use.

In another embodiment of the invention, the imaging device 40 implemented on a lift truck or forklift might be implemented for improved accuracy in various operations without navigation aspects. For example, the invention might also be used in conjunction with other processes having defined item orders such as a replenishment application 88 that monitors item put-away or replenishment, and/or the picking application 82 to improve the accuracy and efficiency of picking and restocking inventory. To this end, the replenishment application 88 or picking application 82 may run on the navigation processor 42 (as illustrated in FIG. 3), on terminal 52, on the centralized computer system 56, or on any other suitable computer. One particular advantage might be realized in using the terminal 52 to run applications 82, 88, and then couple the imaging device 40 directly to the terminal 52 via a suitable interface, such as Bluetooth®, in order to do real-time verification. A more involved navigation processor 42 would not be necessary in this embodiment, and any lift vehicle or other form of lift truck or forklift would just need to supply power to run the imaging device 40.

Figure 8:
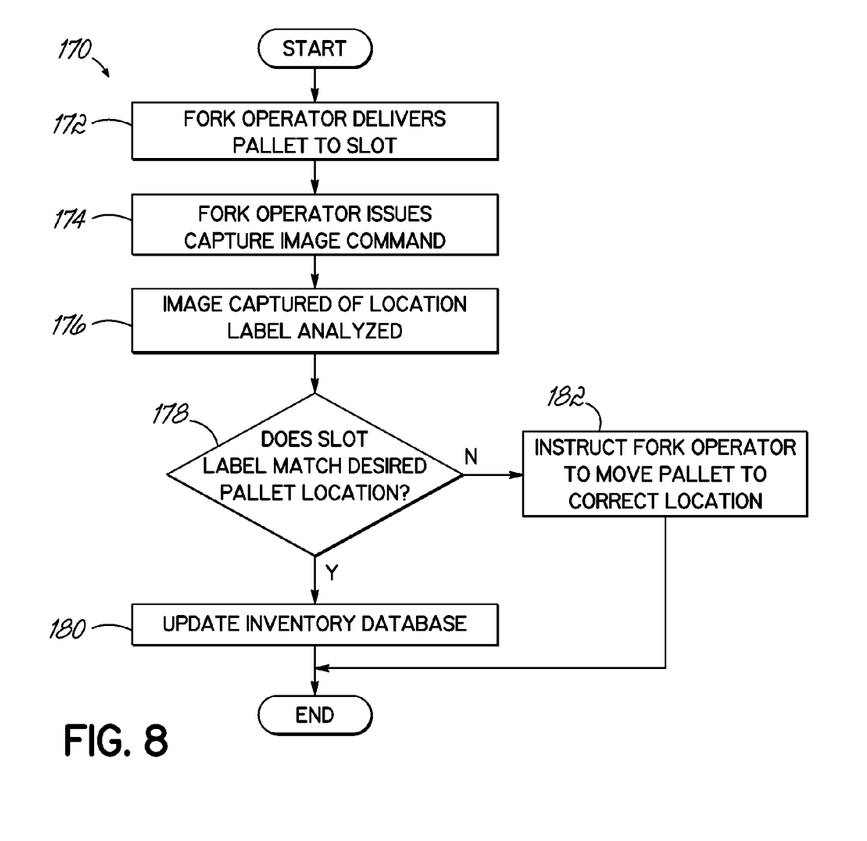
FIG. 8 is a flow chart illustrating one method by which the navigation system in FIG. 3 verifies restocking operations in accordance with an embodiment of the invention.

Referring now to FIG. 8, flow chart 170 illustrates a process whereby an exemplary replenishment application 88 may be used to assist restocking operations. That is, the process is directed to replenishing a location with items or product rather than picking or gathering items. In block 172, a forklift operator delivers a pallet 16, which may be part of a shipment received by the warehouse to restock items 14 stored in a particular slot 22. In block 174, the forklift operator provides a verbal indication to the terminal 52 and the voice-directed system 51 that the pallet 16 has been delivered. This indication may include speaking a trigger command or phrase to capture an image of the slot label.

In block 176, the navigation system 50 captures an image of the slot location label using the imaging device 40, which may be mounted on the front of the lift vehicle or forklift. The image is analyzed by the application 88, which determines the location of the forklift vehicle by analyzing the location label 24 in a similar manner as discussed in detail with reference to FIGS. 3 and 4.

In block 178, the replenishment application 88 determines if the slot location matches the desired pallet location for the replenishment operation. To this end, the replenishment application 88 may obtain information regarding the items 14 carried by the pallet 16 and their desired location within the warehouse from the terminal 52 or centralized computer system 56. This information may also be contained on the inventory map described with reference to FIG. 3. The replenishment application 88 compares the current location of the pallet 16 to the desired position of the pallet 16. If the current and desired locations match ("Yes" branch of decision block 178), the replenishment application 88 may proceed to block 180.

In block 180, the replenishment application 88 may provide an indication to the warehouse management system indicating the pallet 16 has been delivered to the correct slot 22. In response, the warehouse management system may update an inventory database to reflect the replenishment of the items 14. If the current and desired locations of the pallet 16 do not match ("No" branch of decision block 178), the replenishment application 88 may proceed to block 182 and instruct the worker or operator to move the vehicle and pallet 16 or items to the desired slot 22. As in the picking process of FIG. 4, the worker in a replenishment process might also have several pallets that need to be delivered in a particular item order or replenishment order. Therefore, like a picking operation, the worker might be directed to the next replenishment location in the item order and the system may control the movement of the vehicle based on the current determined location and the next location specified in an item order, such as a replenishment order, for example. While the example of FIG. 8 discusses a replenishment application, the feature of location capture and verification can be used with a picking application as well.

Figure 9:
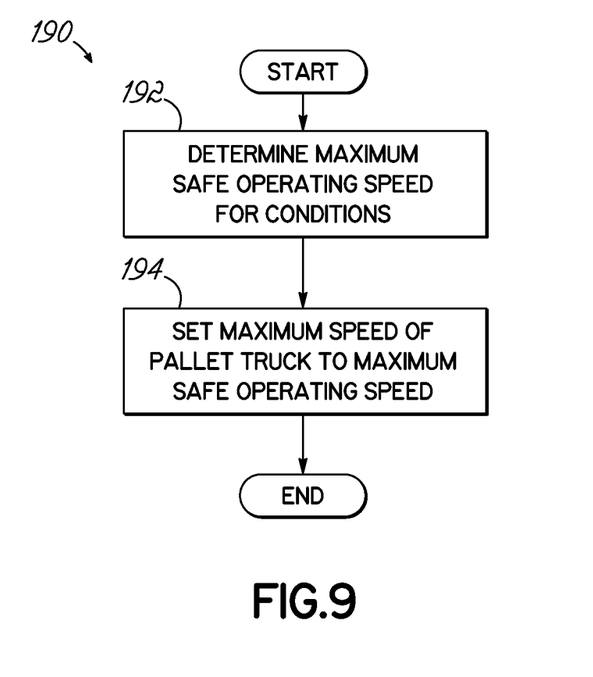
FIG. 9 is a flow chart illustrating one method by which the navigation system in FIG. 3 adjusts the top speed of the lift truck in accordance with an embodiment of the invention.

In accordance with another aspect or embodiment of the present invention, the speed of the lift truck may be monitored. Referring now to FIG. 9, flowchart 190 illustrates a process whereby the navigation system 50 may be used to increase operational safety of the lift truck 32 without overly constraining the lift truck's movement. To this end, the navigation system 50 may be configured to monitor and/or limit the top speed and maximum acceleration/deceleration of the lift truck 32 based on its location within the warehouse as well as the number and type of items on the pallet 16.

In block 192, a governing application 90 may be run by navigation processor 42, and may determine the maximum allowable safe operating speed for the lift truck. Because the speed at which the lift truck 32 may safely travel when carrying a fully loaded pallet 16 is typically less than the safe speed of a lift truck 32 with a lightly loaded pallet 16, the governor application 90 may track the number and type of items as they are added to the pallet 16. As the order is picked, the governor application 90 will recalculate the maximum safe operating speed. Recalculations may be performed at regular intervals of time, each time an item is added to the pallet 16 (which might be determined, for example, from the voice-directed system 51 or picking application 82), and/or based on changes in location as determined by the navigation application 80.

By way of example, the governor application 90 might determine that a relatively low maximum safe operating speed and reduced maximum acceleration/deceleration is necessary if items that have a high center of gravity or that have a tendency to tip over have been loaded onto the pallet 16. Likewise, as the order is picked and more items are stacked on the pallet 16, the determined maximum safe operating speed may drop to prevent items from falling off when the lift truck changes direction or stops abruptly. The governor application 90 may also take into account the location of the lift truck 32 to determine its maximum safe operating speed. For example, areas of the warehouse that are congested or that require tighter turns may require lower maximum safe operating speeds. The governor application 90 may thereby adjust the maximum safe operating speed based on changing environmental conditions. Once the maximum safe operating speed has been determined, the governor application proceeds to block 194.

In block 194, the top speed of the lift truck 32 is set by the governor application 90. The top speed of the lift truck 32 may be set by the governor application 90 by adjusting settings in the controller 75, or by any other suitable set of commands implemented though the CAN-bus 76 or other suitable interface. By regularly updating the maximum safe operating speed of the lift truck 32, the governing application 90 may optimized the maximum speed of the lift truck 32 to conditions. Advantageously, the governor application 90 may thereby increase the safety of the lift truck while reducing transit times by allowing the lift truck 32 to move as quickly as safely possible for the current operating conditions. More advantageously, by reducing load spill events, the governing application 90 may reduce costs associated with damaged products, worker injuries, and lost time while orders are reassembled.

Some of the embodiments described herein are heuristic in nature, and therefore, the heuristic systems make take time before the algorithms become fully effective in the working environment. Adapting the algorithms while users are working can be difficult. To this end, the invention may be used in silent or background mode to collect data while a selector is working. The imaging device 40 may be directly connected or otherwise coupled to centralized computer system 56 via suitable network interface, such as IEEE 802.11 (Wi-Fi), and transfer the images or decoded location labels 24, along with timestamp information to centralized computer system 56. This information may be stored and later provided as mock input to fine tune the navigation 80, picking 82, recording 84, monitoring 86, replenishment 88 and/or governing 90 applications, as per the requirements of the warehouse. The information can also be used as input to test results generated by various heuristic models. As such, the invention might be adapted as it is used.

While the invention has been illustrated by a description of various embodiments, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described herein. Accordingly, departures may be made from such details without departing from the spirit or scope of applicant's general inventive concept.

What is claimed is:

1. A system for the operation and navigation of a moving vehicle in a warehouse environment, the system comprising:
    a controller for controlling operation of the vehicle;
    an imaging device configured to capture an image representing a view from the vehicle;
    a location label configured for being positioned in the warehouse environment and including a location indicia, the location label positioned so that the image captured by the imaging device includes an image of the location label when the vehicle is in proximity to the location label; and
    a navigation processor operatively coupled to the imaging device and configured to determine a location of the vehicle based at least in part on the image of the location label, the navigation processor further coupled with the controller to control the movement of the vehicle based on the determined location and a next location specified in an item order;
    wherein the navigation processor is configured for autonomously moving the vehicle to the next location specified in the item order if the next location specified in the item order is not greater than a predetermined walking distance from the determined location of the vehicle.

2. The system of claim 1 further comprising a voice-directed system configured for providing a speech dialog with a user regarding the location of items in the warehouse environment, the voice-directed system configured for communicating with the navigation processor for controlling the movement of the vehicle based on location of items in the warehouse environment for the processing of the items using the vehicle.

3. The system of claim 1 wherein the location label further includes a target datum having predetermined dimensions, and the navigation processor is further configured to determine the position of the vehicle based at least in part on a dimension of the target datum in the image of the location label.

4. The system of claim 1 wherein the warehouse environment includes at least one structure, the navigation processor operable for using a target datum for determining the distance between the vehicle and the at least one structure, the navigation processor controlling the movement of the vehicle using the determined distance.

5. The system of claim 1 wherein the navigation processor is configured to determine a speed of the vehicle based at least in part on the images of sequentially captured location labels, the navigation processor further coupled with the controller to control the movement of the vehicle based on the determined speed.

6. The system of claim 1 further comprising:
    an inventory map that includes information on a location of an item in a warehouse environment, the navigation processor being further configured to access the inventory map information and autonomously move the vehicle from the determined location of the vehicle to the location of the item.

7. The system of claim 2 wherein the navigation processor is integrated with the voice-directed system to provide speech instructions to the user regarding at least one of interacting with the vehicle or processing items.

8. The system of claim 5 further comprising a map of a warehouse environment, the navigation processor configured to use the determined speed and determined location of the vehicle for comparison to the warehouse environment map to control the movement of the vehicle.

9. The system of claim 2 wherein the voice-directed system is configured to obtain verification information associated with an item, the system further configured to verify that the verification information correlates with the determined location of the vehicle.

10. The system of claim 2 further configured for using the determined location to direct a user with a speech dialog to maintain a record of an item loaded onto the vehicle by capturing an image of the item with the imaging device.

11. The system of claim 1 further configured to monitor an amount of time that the vehicle remains at the determined location, and to determine if the amount of time at the determined location is outside an expected value or range of values.

12. The system of claim 2 wherein the voice-directed system configured for providing a speech dialog with a user regarding the replenishment of items to a location in the warehouse, the system further configured to use the image captured by the image device to verify that items are being delivered to a correct location.

13. The system of claim 1 wherein the navigation processor is further configured to evaluate at least one of the number of items loaded onto the vehicle or the determined location and to determine a maximum allowable speed of the vehicle and using the controller to control maximum speed of the vehicle.

14. A method of operating and navigating a vehicle, the method comprising:
   capturing using an imaging device an image representing a view from the vehicle;
   identifying using a navigation processor a location label in the image;
   detecting using a navigation processor a location indicia on the location label;
   determining using a navigation processor a location of the vehicle based at least in part on the detected location indicia;
   controlling using a navigation processor the movement of the vehicle based on the determined location and a next location specified in an item order;
   accessing an inventory map including information on a location of an item; retrieving a location of an item to be obtained;
   determining whether the location of the item to be obtained is not greater than a predetermined walking distance from the determined location of the vehicle; and
   in response to the location of the item being obtained being not greater than a predetermined walking distance from the determined location of the vehicle autonomously moving the vehicle toward the location of the item.

15. The method of claim 14 further comprising:
   providing a speech dialog with a user regarding the location of items in the warehouse;
   controlling the movement of the vehicle based on the location of items in the warehouse for the processing of the items using the vehicle.

16. The method of claim 14 further comprising:
   detecting a target datum of the location label in the image;
   determining a dimension of the target datum image; and
   based at least in part on the determined dimension of the target datum image, controlling the movement of the vehicle.

17. The method of claim 14 further comprising:
   obtaining spoken verification information associated with the location of an item to be loaded onto the vehicle;
   verifying that the spoken verification information correlates with the determined location of the vehicle.

18. The method of claim 14 further comprising using the determined location and directing a user with a speech dialog to maintain a record of an item loaded on the vehicle by capturing an image of the item with the imaging device.

19. The method of claim 14 further comprising monitoring an amount of time that the vehicle remains at the determined location, and determining if the amount of time at the determined location is outside an expected value or range of values.

\* \* \* \* \*